(12) United States Patent
Jones

(10) Patent No.: US 6,876,167 B1
(45) Date of Patent: Apr. 5, 2005

(54) METHOD AND APPARATUS FOR DETERMINING THE ROTATIONAL RATE OF A ROTATING DEVICE

(75) Inventor: Michael A. Jones, Torrance, CA (US)

(73) Assignee: TRW Automotive U.S. LLC, Livonia, MI (US)

( * ) Notice: Subject to any disclaimer, the term of this patent is extended or adjusted under 35 U.S.C. 154(b) by 174 days.

(21) Appl. No.: 10/350,646

(22) Filed: Jan. 24, 2003

(51) Int. Cl.$^7$ ................................................ H02P 1/04
(52) U.S. Cl. ................... 318/461; 318/569; 318/600; 318/603; 318/606; 318/632; 318/651
(58) Field of Search ............................... 318/461, 569, 318/600, 603, 606, 632, 651, 721

(56) References Cited

U.S. PATENT DOCUMENTS

| | | | |
|---|---|---|---|
| 4,109,170 A | | 8/1978 | Fujita et al. |
| 4,260,920 A | | 4/1981 | Nakamura et al. |
| 4,329,636 A | * | 5/1982 | Uchida et al. .............. 318/721 |
| 4,385,249 A | | 5/1983 | Fukushima |
| 4,578,606 A | | 3/1986 | Welterlin |
| 4,701,650 A | * | 10/1987 | Maemine .................. 310/68 R |
| 4,751,415 A | * | 6/1988 | Kitamori et al. ....... 310/156.01 |
| 4,755,701 A | * | 7/1988 | Shikama ................ 310/156.05 |
| 4,902,923 A | * | 2/1990 | Okauchi ..................... 310/268 |
| 5,361,010 A | * | 11/1994 | Muller ..................... 310/68 B |
| 5,412,999 A | * | 5/1995 | Vigmostad et al. ..... 73/862.333 |
| 5,610,457 A | | 3/1997 | Kurita |
| 5,686,770 A | | 11/1997 | Naito |
| 5,717,268 A | | 2/1998 | Carrier et al. |

\* cited by examiner

Primary Examiner—Rina Duda
(74) Attorney, Agent, or Firm—MacMillan, Sobanski & Todd, LLC

(57) ABSTRACT

A non-invasive apparatus and method for measuring the speed of a rotating device that includes a sensor that measures a dynamic characteristic of the rotating device. A sample of the signal is transformed from the time domain into a frequency spectrum. The frequency spectrum is then analyzed to determine the motor speed. The resulting motor speed can be combined with other motor data by an order analysis to identify malfunctioning or improperly installed components.

27 Claims, 6 Drawing Sheets

METHOD AND APPARATUS FOR DETERMINING THE ROTATIONAL RATE OF A ROTATING DEVICE

BACKGROUND OF INVENTION

This invention relates in general to rotating devices and in particular to a method and apparatus for measuring the rotational rate of a rotating device.

Motor vehicles include an ever increasing number of electrical and electronic systems. Many such systems include components that can generate noise and vibration that can intrude into the vehicle passenger compartment and exceed the Noise, Vibration and Harshness (NVH) specifications for the vehicle. Anti-lock brake and vehicle stability systems include motor driven pumps and cyclically actuated solenoid valves that control application of pressurized brake fluid to wheel brake cylinders. A newer system being provided for vehicles is Electrically Powered Hydraulic Steering (EPHS), that utilizes a motor driven pump to provide hydraulic steering assistance. The EPHS system replaces the conventional hydraulic power steering system in which the power steering pump is mechanically belt driven by a pulley attached to the engine crankshaft. Use of an electric motor in place of the mechanical drive is more efficient since the pump speed is not a direct function of the engine speed. The motor speed varies as a driver requires steering assist, returning to a stand-by state if there is no assist needed.

Typically, a EPHS system includes a brushless DC motor that drives the pump for supplying pressurized hydraulic fluid. Such motors typically include a permanent magnet rotor having a plurality of poles mounted upon a motor shaft. The motor shaft and rotor are rotatably mounted within a stator having a plurality of windings. The motor also includes a switching circuit that sequentially energizes the stator windings to generate a rotating magnetic field. The rotating magnetic field urges the permanent magnet rotor poles into rotation.

The rotation of the motor rotor can generate noise and vibration. Should the motor be incorrectly assembled or include defective parts, such as bearings, the resulting noise and/or vibration may be excessive. Accordingly, it is desirable to test the motors under typical load conditions to assure that they are properly functioning and have been correctly assembled. Additionally, for the proper analysis of vibration, an accurate motor speed measurement is essential.

One known method for measuring motor speed consists of adding a tachometer generator to one end of the motor shaft. One such tachometer generator includes an annular tone ring mounted upon the end of the shaft. The tone ring formed from a low reluctance material, such as steel, and has a plurality of teeth extending from the circumference thereof. A transducer having a coil surrounding a permanent magnet is mounted within the motor housing adjacent to the tone ring. The permanent magnet generates a magnetic field that extends from the magnet pole adjacent to the tone ring toward the tone ring and then returns to the opposite magnet pole.

As a tone ring tooth approaches the magnet, the reluctance of the magnetic path decreases and as the tone ring tooth recedes from the magnet, the reluctance of the magnetic path increases. The magnet field varies inversely with the magnetic path reluctance. The varying magnetic field induces a voltage across the coil surrounding the magnet that is proportional to the rate of change of the magnetic field and generally proportional to the speed of the tone ring teeth passing the magnet. Thus, as the ring teeth sweep past the coil and magnet, a pulsed voltage is produced having a frequency that is a function of the motor speed. Accordingly, the resulting voltage frequency can be converted into the shaft speed. It will be appreciated that other methods are also available for measuring motor speed; however, they all require that additional components be included in the motor.

Alternately, it is possible to mount proximity sensors on the exterior of the motor. For example, one or more Hall effect devices can be mounted upon the outside of the motor housing. The Hall effect devices would detect the switching of field current within a reluctance motor. Again, the Hall effect devices would generate a pulsing voltage with the rate of the pulsed being a function of the motor shaft rotational speed.

SUMMARY OF INVENTION

This invention relates to a method and apparatus for measuring the rotational rate of a rotating device.

It is contemplated that an EPHS system will utilize a totally encapsulated switched reluctance motor. Accordingly, the motor shaft is not accessible for motor speed measurements. Furthermore, the load on the motor will vary as steering commands are received. However, including a tachometer generator for testing purposes would unnecessarily add to motor complexity and cost. Additionally, access to the interior of the motor is prevented when the motor is encapsulated. Therefore, it would be desirable to provide a non-invasive apparatus and method for measuring motor speed and analyzing vibration sources.

While a known non-invasive method is described above that includes one or more Hall effect devices, the signals generated by the detection method are hard to detect upon the outside of a sealed device such as a motor used with a EPHS system. Furthermore, signals that are detected tend to be noisy, causing accuracy problems for the measurement. Accordingly, a non-invasive apparatus and method for measuring motor speed and analyzing vibration sources that also has a low cost and provides accurate data is desirable.

The present invention contemplates an apparatus for measuring the rate of rotation for a rotating device that includes a sensor that measures a time varying parameter of the rotating device, the sensor being operative to generate a signal that is proportional to the measured rotating device parameter. The apparatus also includes a dynamic signal analysis device connected to the sensor, with the dynamic signal analysis device being operative to sample and digitize the signal generated by the sensor. The apparatus further includes a signal processing device connected to the dynamic signal analysis device. The signal processing device being operative to transform the sampled and digitized sensor signal from a time-domain signal into a frequency domain spectrum and to further analyze the frequency domain spectrum to determine the rotation rate of the rotating device. In the preferred embodiment, the transformation utilized by the signal processing device can be either a Fast Fourier Transform or a Discrete Fast Fourier Transform.

In one embodiment of the invention, the apparatus provides a non-invasive measurement of electric motor speed that includes a current probe adapted to be clamped over a conductor that connects an electric motor to a power supply, the current probe being operative to generate a signal that is proportional to the current flowing through the conductor. The dynamic signal analysis device connected to the current probe is operative to sample and digitize the current probe signal. The signal processing device, which can be a computer, microprocessor, a digital signal processor chip, or the like, is operative to transform the sampled and digitized current probe signal from the time domain into a frequency domain spectrum and to further analyze the frequency domain spectrum to determine the speed of the motor.

The invention further contemplates that the rotational rate determined above can be combined with other non-rotational rate data for the rotating device and an order analysis utilized to identify malfunctioning or improperly installed components of the rotating device. In the preferred embodiment, an electric motor that is intended for use in an electrically powered hydraulic steering system is loaded during the testing to simulate the operation of such a steering system while and the motor speed is determined. The motor speed can then be combined with other non-speed data and an order analysis used to verify that the motor is properly assembled.

The invention also contemplates a method for measuring the rotational rate of a rotating device that includes providing a sensor that is connected through a dynamic signal analysis device to a signal processing device that includes an algorithm for transforming a time domain signal into a frequency spectrum, The sensor is then used to measure a dynamic characteristic of the rotating device, the sensor being operative to generate a signal that is proportional to the dynamic characteristic of the rotating device while a load applied to the rotating device is varied. The signal generated by the sensor is measured and the measured signal is sampled and digitized by the dynamic signal analysis device. The sampled and digitized signal is transformed into a frequency spectrum with the signal processing device algorithm and a rate of rotation for the rotating device is then determined from the frequency spectrum.

One embodiment of the above method contemplates a non-invasive method for measuring the speed of an electric motor that includes providing a current probe for the sensor that is connected to the dynamic signal analysis device. The current probe is clamped over a conductor supplying electric current to the electric motor and the load applied to the electric motor may be varied while the motor current is measured. Alternately, other speed-related data can be utilized to determine the motor speed. The measured motor current is sampled and digitized by the dynamic signal analysis device. As described above, the dynamic signal analysis device then transforms the sampled and digitized data into a frequency spectrum with the stored algorithm and then determines the motor speed from the frequency spectrum.

It also is contemplated that the method can include combining the rotational rate with the output of at least one other sensor and then utilizing an order analysis to identify malfunctioning or improperly installed components of the rotating device.

Various objects and advantages of this invention will become apparent to those skilled in the art from the following detailed description of the preferred embodiment, when read in light of the accompanying drawings.

DETAILED DESCRIPTION

Figure 1:
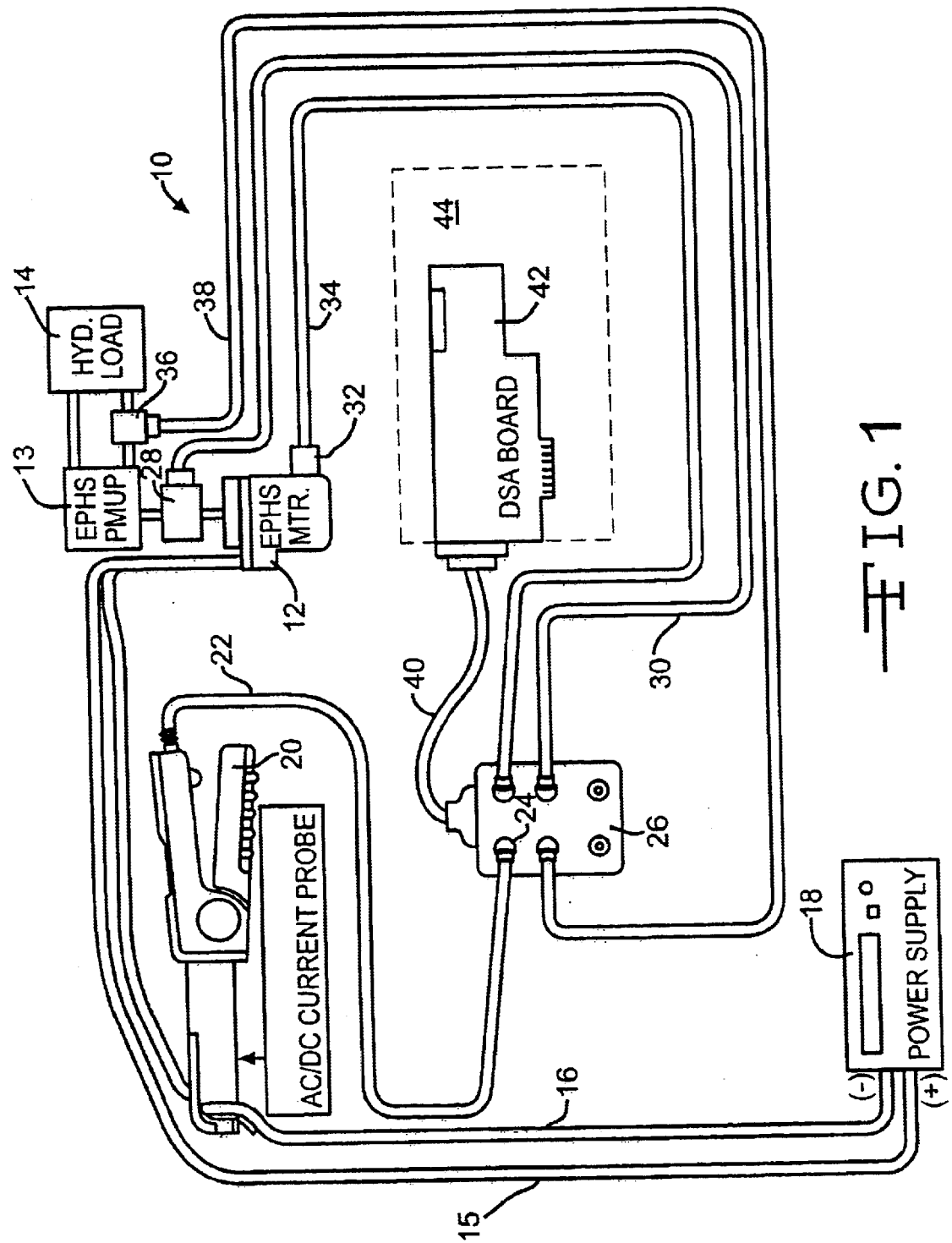
FIG. 1 is schematic diagram of an apparatus for non-invasive measurement of the speed of an electric motor.

Referring now to the drawings, there is illustrated in FIG. 1 a schematic drawing of an apparatus 10 for measurement of the speed of a brushless switched reluctance DC motor 12 for an EPHS system. While the motor 12 utilized in the preferred embodiment is a switched reluctance motor, the apparatus also can be used with other types of electric motors. The motor 12 includes a control circuit that selectively energizes the motor stator windings (not shown) to generate a rotating magnetic field. The energization is accomplished by electronic switching of the DC voltage supplied to the motor. Accordingly, the motor current will fluctuate with the switching. As shown in FIG. 1, the motor shaft is mechanically connected to an EPHS pump 13 that provides a variable mechanical load to the motor 12. The motor includes a control circuit that senses the mechanical demand of the pump 13 and generates a rotating electric field to match the demand. The pump 13 also is connected to a hydraulic circuit 14 that varies the load upon the pump 13. In the preferred embodiment, steering gear is connected to the pump 13 and exercised to simulate the operation of an associated vehicle. Alternately, a simulator can be used for the hydraulic load that duplicates the operation of a typical load.

The motor 12 is connected by two conductors 15 and 16 to a DC power supply 18. In the preferred embodiment, a single output, auto-ranging 2,000 watt Agilent Technologies DC Power Supply is used; however, other similar power supplies also may be used. Additionally, while a power supply 18 is shown in FIG. 1, it will be appreciated that the apparatus 10 also can be used to measure speed for a motor that is installed in a motor vehicle (not shown), in which case, the power supply would be the vehicle battery.

An AC/DC current probe 20 is clamped over a portion of the conductor 16 that connects the negative terminal of the power supply 18 to the motor 12. While the probe 20 is shown connected to the conductor labeled 16, the invention also may be practiced with the probe 20 clamped to the other conductor labeled 15 that connects the positive terminal of the power supply 18 to the motor 12. In the preferred embodiment, an AEMC Instruments SL 201 probe is used that can measure DC currents within the range of 50 milliamps to 2 amps and AC currents within the range of 50 milliamps to 1.5 amps with a 2 percent accuracy. The probe 20 also can measure frequencies within the range of DC to 2 kHz. The probe includes a five foot Binary Network Cable (BNC) 22 that terminates in a 4 mm BNC plug 24 that assures a good connection with the data acquisition system. The probe 20 is operative to sense the magnitude of the current flowing through the conductor 16 to the motor 12 and to generate a time varying voltage that is proportional to the conductor current. While an AEMC SL 201 probe is illustrated in FIG. 1, it will be appreciated that the invention also can be practiced with other similar current probes.

Additionally, while the preferred embodiment is illustrated and described as utilizing a non-invasive current probe, it will also be appreciated that the invention also can be practiced with a current shunt (not shown). A current shunt comprises a resistor that is included in one of the conductors 15 or 16. The resistor has a very low value in order to not impede the current flow. The voltage appearing across the resistor is monitored and is proportional to the current flowing through the shunt. Indeed, such a current shunt can be included within the motor without incurring much additional cost.

The probe BNC plug 24 is connected to one of the input ports of a signal connector assembly, or connector box 26. In the preferred embodiment, a National Instruments BNC-2140 Dynamic Signal Acquisition connector box is utilized; however, as with the probe 20, other similar connector boxes can be used. The BNC-2140 connector box has four ports, that are shown in the upper portion of the box 26 in FIG. 1, for input channels that receive data and two ports, that are shown in the lower portion of the box 26, for output channels.

The connector box 26 can receive additional input information for analysis, as illustrated in FIG. 1. The present invention contemplates that the other input ports may be connected to other sensors. For example, a torque cell 28 is shown mounted between the motor 12 and the pump 13 in FIG. 1. The torque cell 28 generates a signal that is proportional to the torque being supplied by the motor 12 to the pump 13. A second BNC 30 connects the output of the torque cell 28 to one of the input ports of the connector box 26. An accelerometer 32 is attached to the motor housing and generates a signal that is proportional to housing vibrations. The accelerometer 32 is connected by a third BNC 34 to another input port of the connector box 26. While the accelerometer 32 is shown mounted upon the motor housing, it is also possible to utilize a laser vibrometer (not shown) that does not physically contact the motor housing. Finally, a hydraulic pressure transducer 36 is shown inserted in one of the hydraulic lines connecting the pump 13 to the hydraulic load 14. The pressure transducer generates a signal that is proportional to the pressure in the hydraulic line and is connected to the connector box 26 by a fourth BNC 38. It is also contemplated that a microphone (not shown) can be mounted near the motor to detect noises that are a function of motor vibration. As discussed above, a current shunt (not shown) can be inserted into one of the conductors 15 or 16 in place of the current probe 20.

The connector box 26 is operative to condition the signals received on all four input channels with integrated signal conditioning circuitry thereby reducing the needed amount of equipment. Additionally, the connector box 26 can be configured to connect the shell of the BNC 22 to ground.

The connector box 26 is connected by an analog cable 40 to a Dynamic Signal Analysis (DSA) board 42. Each end of the analog cable terminates in a 68 pin connector. In the preferred embodiment, a National Instruments SHC 68-C68-A1 analog cable is used; however, as before, any other compatible cable also can be utilized. In the preferred embodiment, the DSA board 42 also is supplied by National Instruments, with a type NI-4452 DSA board being used. As shown in FIG. 1, the DSA board 42 is included in a data processing computer 44, which is shown with an dashed outline. The DSA board 42 has four analog input channels. Each of the four analog input channels is connected to 16 bit Analog to Digital Converter (ADC) that converts the analog signal to a digital signal for processing. While the preferred embodiment utilizes a 16 bit ADC, it will be appreciated that it also is possible to practice the invention with other ADC's, such as, for example, a 24 bit ADC. The board 42 samples the input data and the sampling clock included in the board 42 is synchronized with the clock in the computer 32 via a RTSI bus. The RTSI bus also synchronizes any other boards that are utilized to analyze the data, including additional high-resolution data acquisition boards, thus increasing the number of channels that may be analyzed. As will be explained below, the DAC board 42 utilizes available National Instrument software specifically designed for the board 42 to calculate a frequency spectrum associated with a portion of the data sampled by the probe 20. The output of the board 42 is digital and supplied to the computer 44 for further analysis.

The computer 44 can be a stand alone device, such as a personal computer, that is dedicated to a set of test equipment. Alternately, a microprocessor, an Application Specific Integrated Circuit (ASIC) or a Digital Signal Processor (DSP) chip can be used. The computer 44 has a memory that stores an algorithm for processing the data received from the current probe 20 and any other sensors connected to the connection box 26. Similarly, if an ASIC or DSP chip is used, the devices also will store the algorithm for processing the data.

Figure 2:
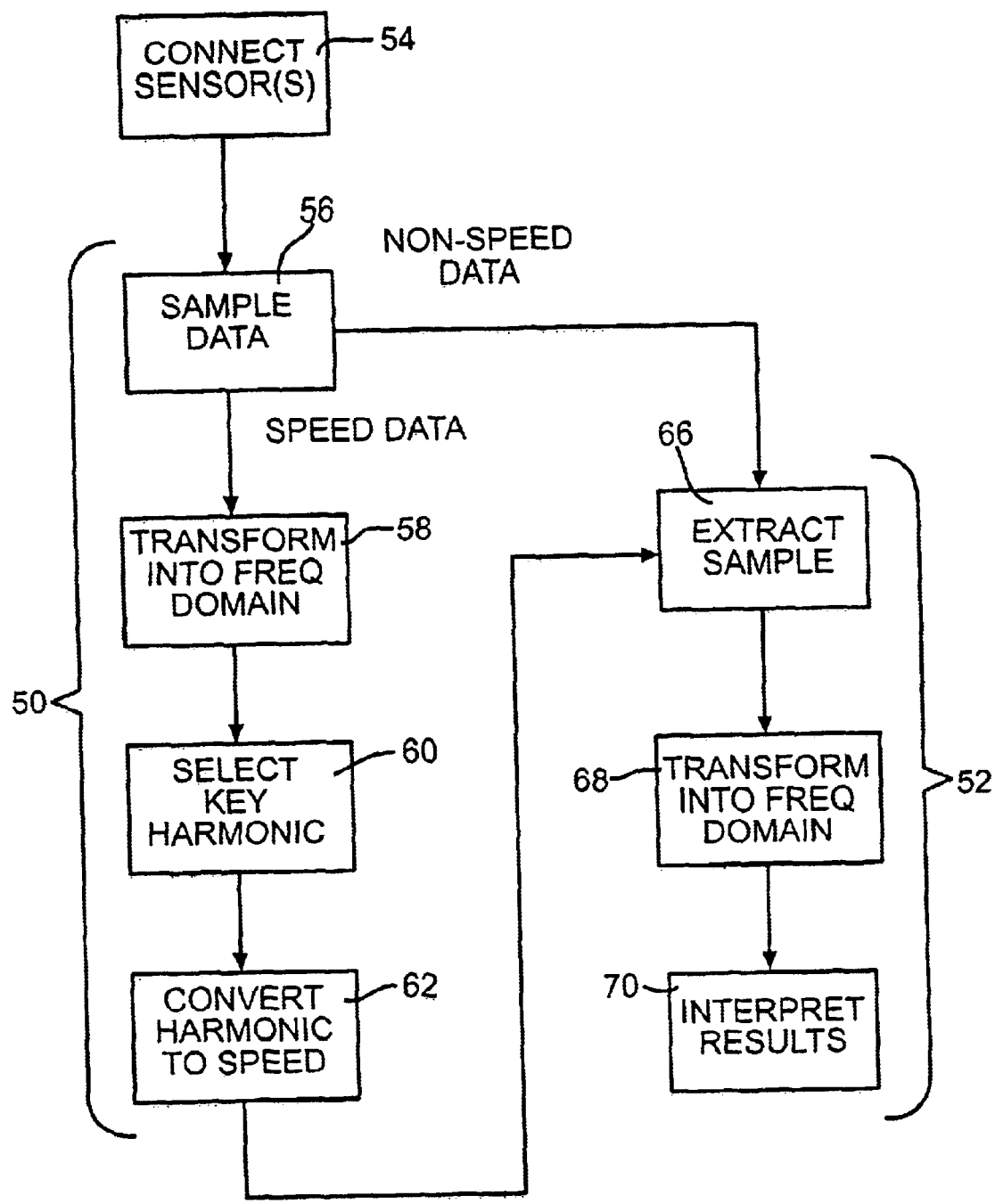
FIG. 2 is a flow chart for a method of using the apparatus in FIG. 1, to obtain a rotation rate and using that rotation rate to conduct an order analysis.

The analysis of the data obtained from the probe 20 and converted by the DSA board 42 will now be explained with reference to the flow chart shown in FIG. 2. The flow chart in FIG. 2 is subdivided into two portions. The first portion, which labeled 50, is concerned with determination of the motor speed, while the second portion, which is labeled 52, is concerned with further analysis of available data in combination with the previously determined motor speed to determine the condition of the motor 12. It will be appreciated that the first portion 50 can be practiced without the second portion 52 if only the motor speed is desired.

Figure 3:
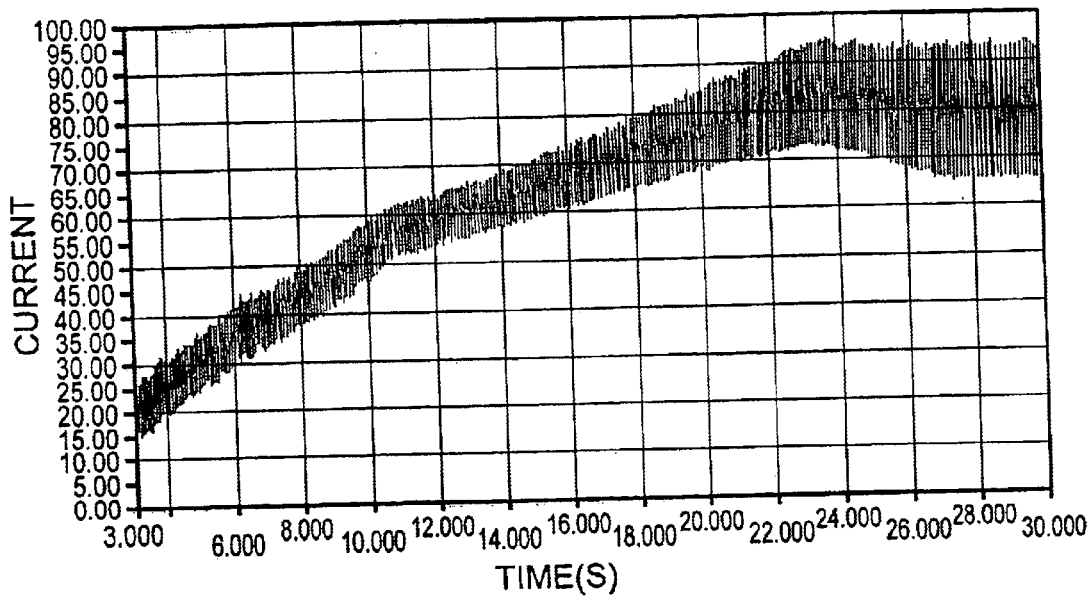
FIG. 3 illustrates the motor current, as a function of time, sensed by the apparatus shown in FIG. 1.
Figure 4:
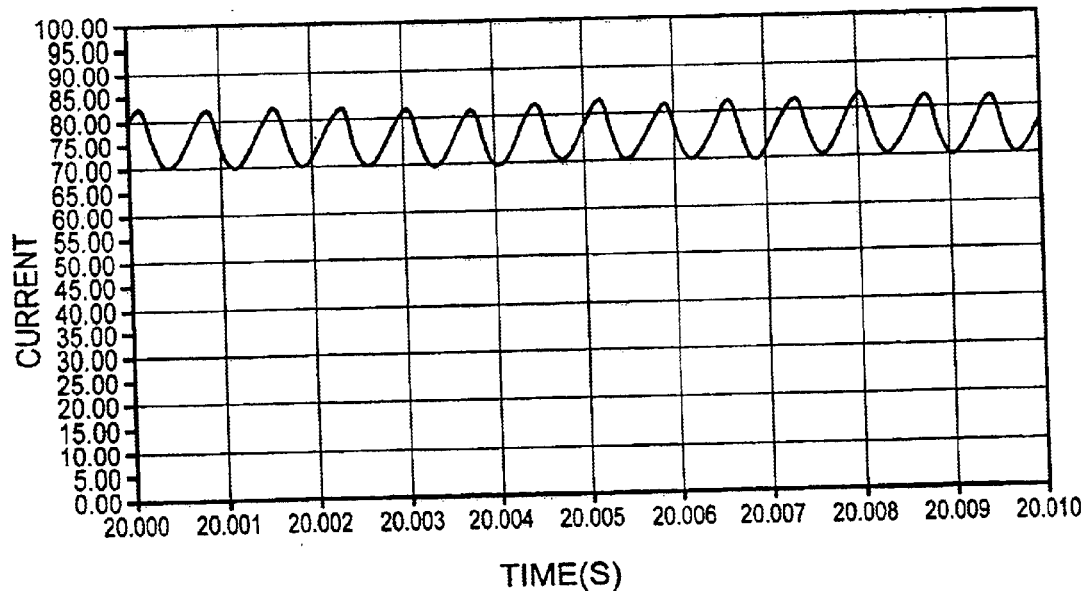
FIG. 4 shows a subset of the data shown in FIG. 3.

In functional block 54 the current probe 20 is clamped onto one of the conductors, 15 or 16. If other parameters are being analyzed, the sensors corresponding to the other parameters also are attached in functional block 54. The motor 12 is energized by the power supply 18 and the hydraulic load 14 provides a variable demand to the pump 13 and the motor 12 to simulate operation of an EPHS system. The probe 20 senses the current flowing through the clamped conductor and generates an input voltage that is supplied to the DSA board 42 through the connector box 26. The input voltage, which is illustrated in FIG. 3, is proportional to the current flowing though the clamped conductor while the motor 12 is running. As can be seen in FIG. 3, the average input voltage increases with the passage of time. A subset of the voltage between 20 and 20.01 seconds is shown in FIG. 4. As shown in FIG. 4, the current is oscillatory in nature with the amplitude varying with time. Alternately, the voltage across a current shunt (not shown) can be supplied to the DSA board 42 through the connector box 26.

The DSA board 42 samples the input voltage from the current probe 20 at a predetermined rate in functional block 56. If additional sensors are used, the signals generated by the additional sensors are also sampled in functional block 56. The sampled data is divided into two data streams in FIG. 2. The speed related data is forwarded to functional block 58 while any non-speed related data is forwarded to functional block 64, which will be described below. The predetermined sampling rate is selected to provide adequate resolution for the motor speed. The DSA board 42 described above is capable of sampling within a range from 5,000 samples per second to 204,800 samples per second. In the preferred embodiment, the DSA board 30 is set to sample at a rate of 25,000 samples per second; however, other sampling rates also may be utilized. For the following example, the signal is broken down into subsets of 2,500 samples that have a sample period of 0.1 second. The method of analysis determines the average speed of the motor over each sampling period. The reciprocal of the sample period is 10 Hz, which represents the accuracy of the measurement. Thus, the resulting computational error in frequency would be ±5 Hz.

Figure 5:
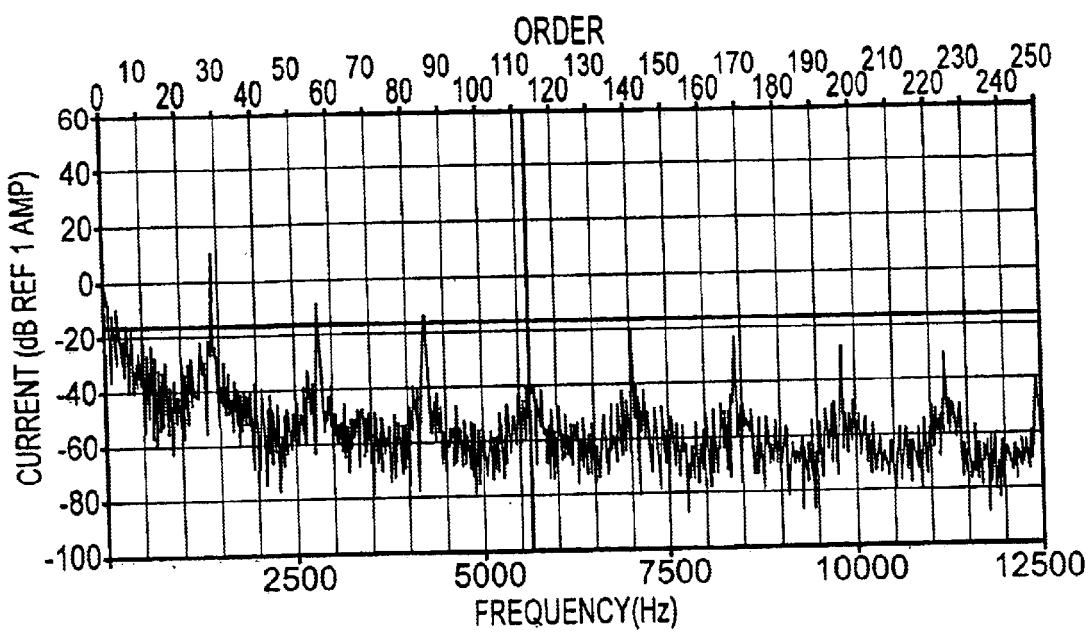
FIG. 5 is the frequency spectrum that corresponds to the data shown in FIG. 4.

The sampled speed related data is transformed from the time domain to the frequency domain by the computer 44 in functional block 58 with a Fourier transform. The invention contemplates that a Fast Fourier Transform (FFT) is utilized when the data points are an even multiple of two while a Discrete Fast Fourier Transform (DFFT) is used when the data points are not an even multiple of two. Either transform can be utilized when the motor is operated with either a constant or a varying load that causes its speed to change. Either of the FFT or DFFT produces a frequency spectrum, such as illustrated in FIG. 5, where the lower horizontal axis represents frequency and the vertical axis is a logarithmic scale for the amplitude of each of the frequency spectrum components, such that 20 Decibels (dB) represents 10 amps of current while 40 dB represents 100 amps.

The algorithm in the computer 44 utilizes the frequency spectrum determined in functional block 58 to calculate the motor speed. The first harmonic of the frequency spectrum, $f_1$, is selected in functional block 60 by finding the maximum value in the frequency spectrum above a minimum frequency, $f_x$. In functional block 62, the selected harmonic is converted to motor speed. The first harmonic $f_1$ is related to the motor structure by the following relationship:

$$f_1=[(\text{motor speed } (rpm))(\text{number of poles})(\text{number of phases})]/60,$$

where $f_x$ is sufficiently above the DC offset to exclude the zero Hertz peak. By excluding the zero data point the transformation removes the varying DC offset of the signal.

If, for example, the motor 12 is a seven pole, four phase motor, the above formula becomes:

$$f_1=[(rpm)(7)(4)]/60, \text{ or } f_1=(rpm)(28)/60;$$

where rpm is revolutions per minute, or the motor speed. In functional block 62, the above formula is solved to determine the motor speed as follows:

$$rpm=(60)(f_1)/28$$

Figure 6:
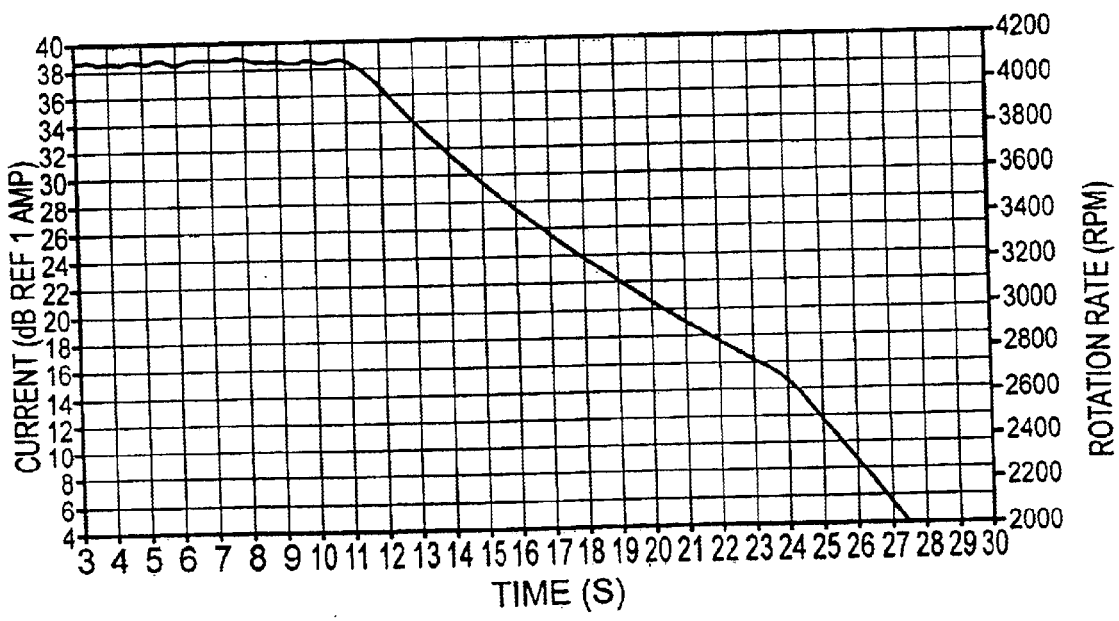
FIG. 6 is the calculated motor speed that corresponds to the current shown in FIG. 3 as determined with the present invention.

A plot of the resulting motor speed over time that corresponds to the current probe measurement shown in FIG. 3 is shown in FIG. 6.

The dynamic order analysis described above selects the first harmonic. Selection of the first harmonic yields a speed calculation error of ± one half of a bin. For the above motor example, a frequency of 1400 Hz would correspond to the first harmonic. Accordingly, at a resolution of 10 Hz per bin, the speed would be determined to an accuracy of (±0.5 bin/140 bins) or ±0.4 percent.

For greater speed determination accuracy, a multiple of the first maximum frequency $f_1$ can be selected in functional block 60. For example, one can use four times the frequency of the first harmonic, which would improve the speed determination accuracy to ±0.1 percent. Continuing the example, the first harmonic frequency, corresponding to $f_1$, may be multiplied by 4 and the frequency, $f_4$, of the fourth harmonic of the signal in the frequency domain within the following range is determined from the following relationship:

$$f_4=\text{frequency of the maximum value within the range of } (4*f_1-5 \text{ bins}) \leq f_4 < (4*f_1+5 \text{ bins}).$$

The frequency $f_4$, which represents the fourth harmonic for the motor, is then converted to motor speed in functional block 62 by the following formula:

$$rpm=(f_4)(60)/[(\text{number of poles})(\text{number of phases})(4)]; \text{ or}$$

$$rpm=(f_4)(0.535).$$

The above formula provides an non-invasive speed determination for the motor 12 that is equivalent to adding a 112 pulse per revolution encoder to the motor. While the preferred embodiment has been described above as utilizing the first and fourth harmonics, it will be appreciated that other harmonics also can be used to further increase the accuracy. For example, use of the fifth harmonic would be equivalent to adding a 140 pulse per revolution encoder to the motor.

As indicated above, the invention further contemplates that the motor speed determined in functional block 62 can be utilized to analyze other motor data. As described above, additional sensors (not shown) can be attached to the motor 12, such as, for example, accelerometers to measure vibration frequency and magnitude at selected locations of the motor. The additional sensors are attached in functional block 54 for the flowchart shown in FIG. 2. For the configuration illustrated in FIG. 1, up to three sensors, in addition to the current probe 20, can be utilized. It is noted that, for other configurations (not shown) using different components than those described above, more than four input data channels can be provided.

Figure 7:
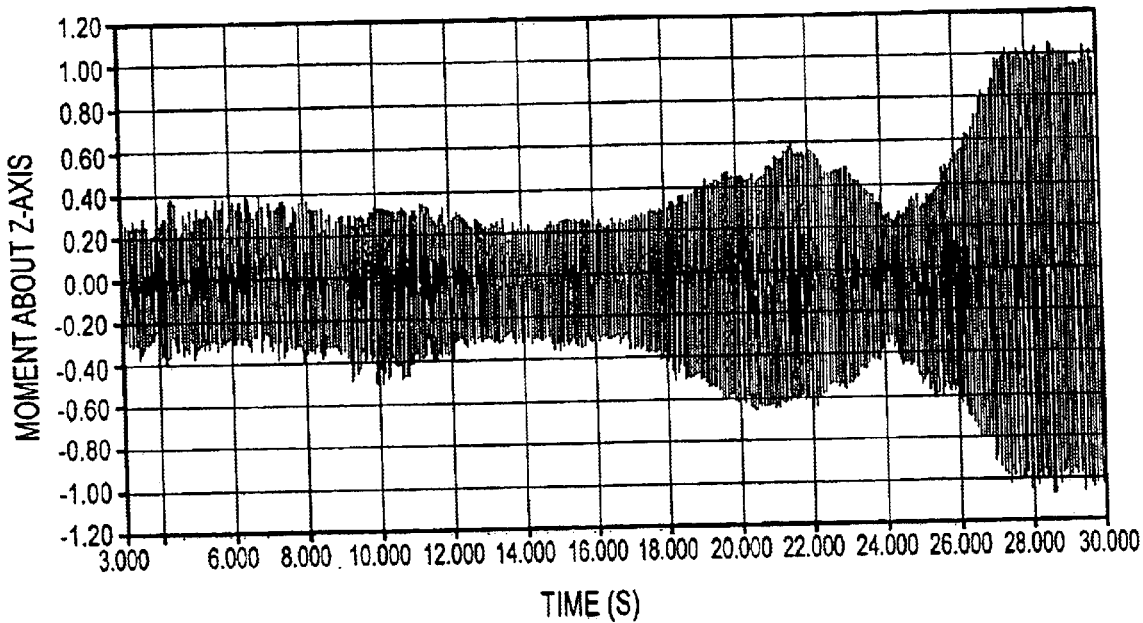
FIG. 7 illustrates the output sensed by a torque cell in FIG. 1, simultaneously sampled with the current shown in FIG. 3.

As described above, the non-speed related sensor output signals are collected in functional block 56, simultaneously with the speed related data, and supplied to the DSA board 42 where the data stream is sampled and digitized. As an example, the output of the torque sensor 28 as a function of time is illustrated in FIG. 7. It will be appreciated that while the non-speed data is collected in functional bock 64 simultaneously with the speed data collected in functional block 56, complete analysis of the acquired data requires knowledge of the motor speed. Accordingly, this analysis is delayed by the time required for the speed determination analysis to be completed in functional block 62. For testing purposes, the analysis delay is acceptable because the data is typically analyzed following the running of the test. However, because the motor speed can be quickly calculated, it is possible to determine the non-speed data results in a near real time fashion. In the imbedded example, this delay is only on the order of 0.1 second.

Figure 8:
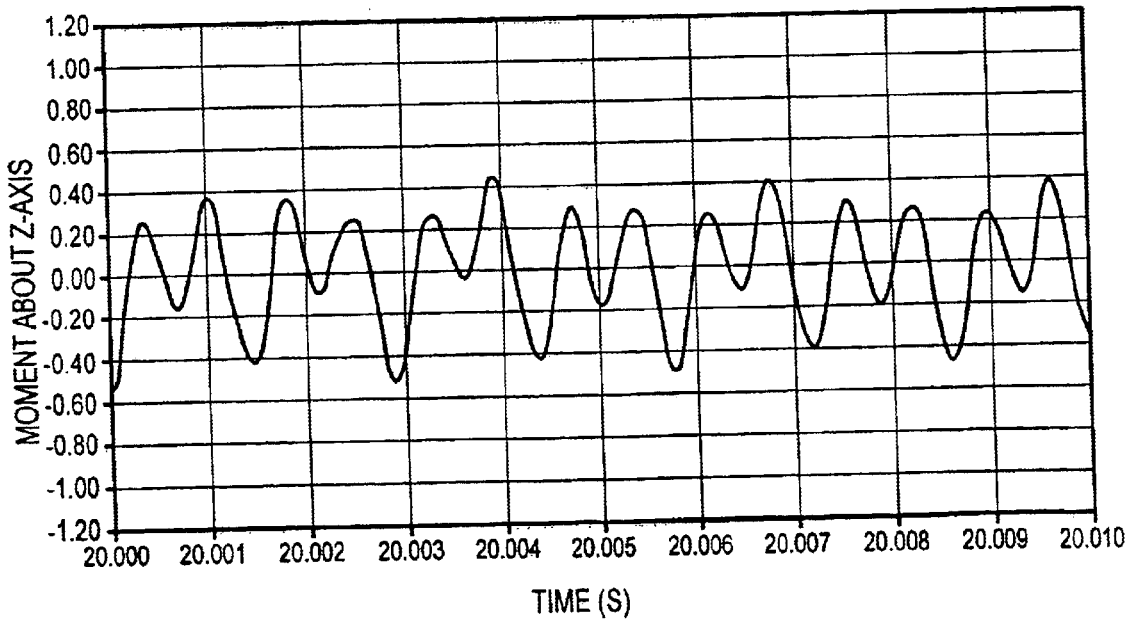
FIG. 8 shows a subset of the data shown in FIG. 7.

A subset of the non-speed sampled data consisting of Q data points is selected in functional block 66 that corresponds to the speed signal data selected in functional block 56. The subset of torque data points is illustrated in FIG. 8, and is similar to the subset of speed data points shown in FIG. 4. Thus, the Q data points are selected in functional block 66 to be centered in the time domain about the center of the time domain data set used to determine the motor speed. For the example given above, the number of data points needed for an order resolution of P, is given by the following relationship:

$$Q=(\text{sample rate in samples per second})(60)/(rpm)(P)$$

Continuing the example given above, it is assumed that the sampling rate is 25,000 samples per second and the order of resolution is ¼. Substituting these values in the above relationship produces the following number of needed data points:

$$Q=(6\times10^6)/rpm$$

Figure 9:
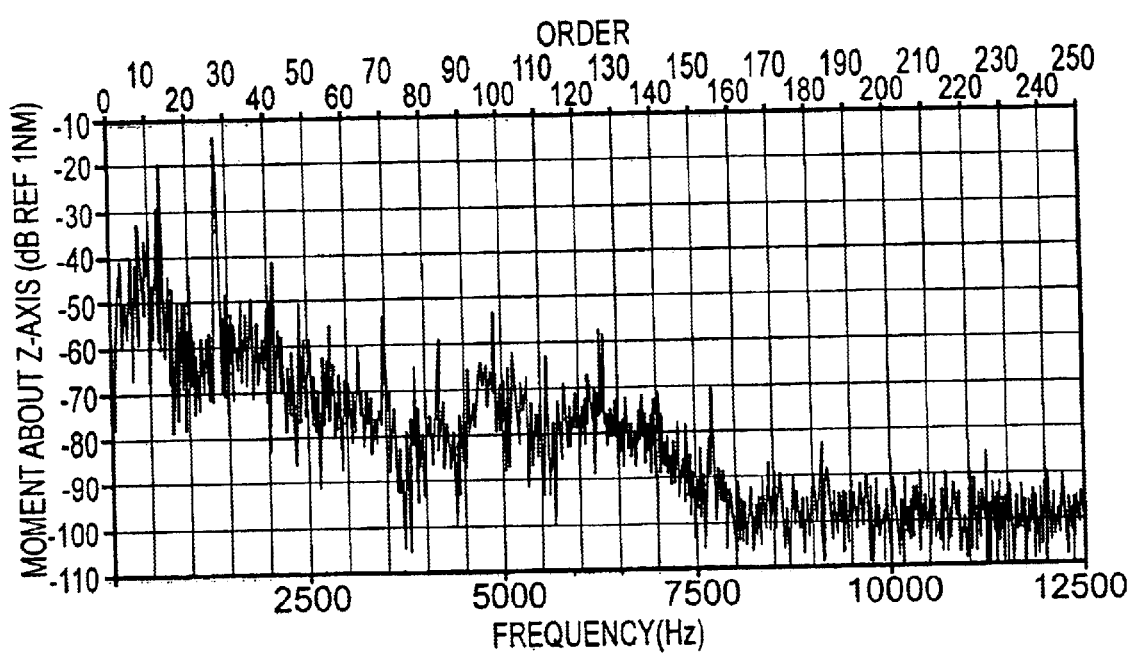
FIG. 9 is the frequency spectrum that corresponds to the data shown in FIG. 8.

The Q data points are collected and then converted with a FFT or DFFT into the order domain with either a FFT or DFFT in functional block 68. A typical order spectrum for a set of additional data points is illustrated in FIG. 9, where the order axis is the upper horizontal axis.

The data is analyzed with an order analysis and interpreted in functional block 70 to determine if the motor 12 is malfunctioning and/or improperly assembled. The inventor has found that the order analysis can provide information to identify a faulty component, such as, for example, a bad bearing; or to identify an improperly installed motor component, such as, for example, an improperly positioned magnet within the motor. Those experienced in the art of order analysis can readily appreciate further applications of the above described invention.

It is further contemplated that the invention also can be used for any measurement of any rotating machinery. For example, data can be taken from the hydraulic pump 13 to determine whether the pump is operating satisfactorily. The sensor could be the pressure transducer 36 illustrated in FIG. 1, a microphone (not shown) or a device for measuring the motion of the hydraulic fluid transfer lines such as, for example, a laser vibrometer or an accelerometer. The product of the number of poles and the number of phases in the above formulas would then be replaced with the number of teeth for a gear pump or the number of vanes for a vane pump. For the EPHS system described above, a gear pump with 12 teeth is typically used. In a similar manner, the an outside pickup can be attached to the motor 12 to sample other data than speed. Similarly, it is contemplated that the invention also can be utilized to measure tire rotational speed by monitoring the output of an accelerometer mounted inside a tire.

The principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described in terms of readily available test components, the invention also can be implemented with test equipment and data conditioning circuits specifically designed to implement the invention. Additionally, the invention is not intended for use only in a test facility but may be mounted upon an operational vehicle.

What is claimed is:

1. An apparatus for measuring the rate of rotation for a rotating device comprising of:
    a sensor that measures a time varying parameter of the rotating device, said sensor being operative to generate a signal that is proportional to the measured rotating device parameter;
    a dynamic signal analysis device connected to said sensor, said dynamic signal analysis device operative to sample said signal generated by said sensor, said signal analysis device further operative to digitize said signal generated by said sensor; and
    a signal processing device connected to said dynamic signal analysis device, said signal processing device operative to transform said sampled and digitized sensor signal from a time-domain signal into a frequency domain spectrum, said signal processing device further operative to analyze said frequency domain spectrum to determine the rotation rate of the rotating device.

2. The apparatus according to claim 1 wherein said signal processing device is a microcomputer.

3. The apparatus according to claim 1 wherein said signal processing device is included in an application specific integrated circuit.

4. The apparatus according to claim 1 wherein said signal processing device is a digital signal processor chip.

5. The apparatus according to claim 1 wherein said signal processing device is a digital computer.

6. The apparatus according to claim 1 wherein said transform is a Fast Fourier Transform.

7. The apparatus according to claim 1 wherein said transform is a Discrete Fast Fourier Transform.

8. The apparatus according to claim 6 wherein the rotating device is an electric motor and the time varying parameter is the motor current and further wherein said signal processing device is operative to determine the motor speed from the following formula:

$$f_1=[(\text{motor speed})(\text{number of motor poles})(\text{number of motor phases})]/60,$$

where $f_1$ is a first maximum of the frequency spectrum above a minimum frequency.

9. The apparatus according to claim 6 wherein the rotating device is a gear pump and the time varying parameter is the time varying pressure produced by the pump and further wherein said signal processing device is operative to determine the motor speed from the following formula:

$$f_1=[(\text{motor speed})(\text{number of gear teeth})]/60,$$

where $f_1$ is a first maximum of the frequency spectrum above a minimum frequency.

10. The apparatus according to claim 6 wherein said rotating device is an electric motor and further wherein said signal processing device further is operative to perform an $N^{th}$ order frequency analysis that determines the motor speed from the following formula:

$$rpm=(f_N)(60)/(\text{number of poles})(\text{number of phased})(N)=(f_N)(0.535),$$

where:

$$f_N=\{\text{maximum value within the range of } (4f_1-5 \text{ bins})<f_4<(4f_1+5 \text{ bins})\}.$$

11. The apparatus according to claim 6 wherein said rotating device is an electric motor and further wherein said motor is adapted for use in a vehicle electrically powered hydraulic steering system.

12. The apparatus according to claim 11 further including a load connected to the shaft of said motor, said load providing a time varying loading that simulates operation of an electrically powered hydraulic steering system.

13. The apparatus according to claim 11 further including a hydraulic pump connected to said motor, said hydraulic pump connected to a hydraulic load that is operative to simulate operation of an electrically powered hydraulic steering system.

14. The apparatus according to clam 13 wherein the electric motor includes at least one conductor for supplying electricity to the motor and further wherein said sensor is a current probe that is adapted to be clamped over said conductor, said current probe being operative to generate a signal that is proportional to a current flowing in said conductor.

15. The apparatus according to claim 13 wherein said sensor is a first sensor and further wherein the apparatus includes a second sensor adapted to be attached to said motor, said second sensor generating a sensor signal that is representative of the operation of said motor, said second sensor connected to said dynamic signal analysis device with said second sensor signal being sampled and digitized, said computer being operative to utilize said rotation rate of said motor to transform said second sensor signal to determine the condition of a motor component.

16. The apparatus according to claim 15 wherein said motor sensor is an accelerometer and said sensor generates a signal that is representative of a motor vibration.

17. A method for measuring the rate of rotation for a rotating device, the method comprising the steps of:
  (a) providing a sensor that is connected through a dynamic signal analysis device to a signal processing device that includes an algorithm for transforming a time domain signal into a frequency spectrum;
  (b) using the sensor to measure a dynamic characteristic of the rotating device, the sensor being operative to generate a signal that is proportional to the dynamic characteristic of the rotating device;
  (c) varying a load applied to the rotating device;
  (d) measuring the signal generated by the sensor during step (c);
  (e) sampling and digitizing the measured signal with the dynamic signal analysis device;
  (f) transforming the sampled and digitized signal into a frequency spectrum with the signal processing device algorithm; and
  (g) determining a value for the rate of rotation for the rotating device from the frequency spectrum.

18. The method according to claim 17 wherein the transformation in step (f) utilizes a Fast Fourier Transform.

19. The method according to claim 17 wherein the transformation in step (f) utilizes a Discrete Fast Fourier Transform.

20. The method according to claim 19 wherein the rotating device is an electric motor and the parameter is the current supplied to the motor.

21. The method according to claim 20 wherein the sensor provided in step (a) is a current probe that is clamped over a conductor supplying an electric current to the motor with the probe being operable to in step (b) to generate a signal that is proportional to the current flowing through the conductor.

22. The method according to claim 19 wherein the rotating device is a pump and the parameter is the time varying pressure produced by the pump.

23. The method according to claim 20 wherein step (g) includes determining the motor speed from the following formula:

$$f_1 = [(\text{motor speed})(\text{number of motor poles})(\text{number of motor phases})]/60,$$

where $f_1$ is a first maximum of the frequency spectrum above a minimum frequency.

24. The method according to claim 17 wherein the motor speed determination in step (g) further includes an $N^{th}$ order frequency analysis.

25. The method according to claim 24 wherein step (g) includes determining the motor speed from the following formula:

$$rpm = (f_N)(60)/(\text{number of poles})(\text{number of phased})(N) = (f_N)(0.535),$$

where:

$$f_N = \{\text{maximum value within the range of } (4f_1 - 5 \text{ bins}) < f_4 < (4f_1 + 5 \text{ bins})\}.$$

26. The method according to claim 20 wherein the sensor is provided in step (a) is a first sensor and further wherein a second sensor is attached to said motor in step (b), said second sensor generating a signal in step (d) that is a function of a non-speed motor parameter, and further wherein step (g) includes using the motor speed and the sensor output to determine the condition of a motor component.

27. The method according to claim 26 wherein the non-speed data is transformed to determine the condition to the motor component.

* * * * *